(12) United States Patent
Shin et al.

(10) Patent No.: US 9,496,703 B2
(45) Date of Patent: Nov. 15, 2016

(54) LEAKAGE CURRENT DETECTION CIRCUIT, LIGHT APPARATUS COMPRISING THE SAME AND LEAKAGE CURRENT DETECTION METHOD

(71) Applicant: Magnachip Semiconductor, Ltd., Seoul (KR)

(72) Inventors: Doo Soo Shin, Seoul (KR); Su Wan Park, Anyang (KR); Young Gi Ryu, Seoul (KR); Young Lok Shin, Bucheon (KR)

(73) Assignee: MagnaChip Semiconductor, Ltd. (KR)

( * ) Notice: Subject to any disclaimer, the term of this patent is extended or adjusted under 35 U.S.C. 154(b) by 0 days.

(21) Appl. No.: 15/067,347

(22) Filed: Mar. 11, 2016

(65) Prior Publication Data

US 2016/0276824 A1   Sep. 22, 2016

(30) Foreign Application Priority Data

Mar. 16, 2015  (KR) ........................ 10-2015-0036086

(51) Int. Cl.
*H05B 37/02* (2006.01)
*H02H 3/16* (2006.01)
*H05B 33/08* (2006.01)

(52) U.S. Cl.
CPC ............ *H02H 3/16* (2013.01); *H05B 33/0815* (2013.01)

(58) Field of Classification Search
CPC .. H05B 37/02; H05B 37/0227; H05B 33/08; H05B 33/0815; H05B 33/0833; H05B 33/0839; H05B 33/0842; H05B 33/0875; H05B 33/0881
USPC ............ 315/209 R, 210, 291, 294, 307, 308; 363/21.12, 21.18
See application file for complete search history.

(56) References Cited

U.S. PATENT DOCUMENTS 7,863,836 B2    1/2011  Mednik et al.
2011/0096574 A1*  4/2011  Huang ............. H02M 3/33507
                                           363/21.18

* cited by examiner

*Primary Examiner* — Jimmy Vu
(74) *Attorney, Agent, or Firm* — McGuireWoods LLP

(57) ABSTRACT

A leakage current detection circuit includes a driving voltage detection unit that detects a cut-off point of a driving voltage regulated through a driving voltage switch, a leakage current detection unit that detects a leakage current of the driving voltage switch after cutting off of the driving voltage, generates a leakage detection signal when a driving voltage related to the leakage current exceeds a reference detection voltage and a driving voltage control unit that turns off the driving voltage switch at a cut-off point of the driving voltage to cut off the driving voltage and maintain the driving voltage switch in an off state when the leakage detection signal is received. The leakage current detection circuit detects a leakage current passing through the driving voltage switch when abnormal operation of a light emitting diode light apparatus occurs, and keeps the driving voltage switch in an off state during cutoff periods to prevent burning of the drive voltage switch.

15 Claims, 7 Drawing Sheets

LEAKAGE CURRENT DETECTION CIRCUIT, LIGHT APPARATUS COMPRISING THE SAME AND LEAKAGE CURRENT DETECTION METHOD

CROSS-REFERENCE TO RELATED APPLICATION

This application claims the benefit under 35 U.S.C. §119 of Korean Patent Application No. 10-2015-0036086, filed on Mar. 16, 2015, in the Korean Intellectual Property Office, the entire disclosure of which is incorporated herein by reference for all purposes.

BACKGROUND OF THE DISCLOSURE

1. Field of the Disclosure

This disclosure relates to a method and an apparatus for driving a light apparatus, and, more particularly, a method and an apparatus for driving a leakage current detection circuit and a light apparatus having the same to detect a leakage current and control a driving voltage switch to prevent damage to the switch, for example.

2. Description of Related Art

An LED (Light Emitting Diode) light apparatus may be driven by means of a switching converter, such as, for example, a Buck-type, a Boost-type, or a Buck-Boost-type converter. Heretofore, Boost-type converters were mostly used. However, recently Buck-type converters have been used for cost reduction purposes in integrated circuits (I.C.). The type of switching converter may be determined based on a ratio of a difference between an input voltage and an output voltage, wherein the converter may include a power MOSFET in order to form an inductor current.

The LED light apparatus may be driven by a high efficiency light apparatus driving circuit that includes a power MOSFET. When an abnormal situation occurs at a switching converter, a voltage applied to a drain terminal of a power MOSFET may exceed a limit and a leakage current may flow through the power MOSFET. If the abnormal situation continues at the switching converter, the power MOSFET may burn or otherwise fail to function properly.

Therefore, an unfulfilled need exists for a leakage current detection apparatus and a method therefor that may prevent a driving voltage switch such as a power MOSFET from burning or otherwise failing to function properly during, for example, an abnormal situation.

SUMMARY OF THE DISCLOSURE

According to an aspect of the present disclosure, a leakage current passing through a driving voltage switch may be detected when an abnormal situation occurs in an LED light apparatus. The leakage current may be detected and, based on the detected leakage current, the driving voltage switch may be maintained in an off state. The driving voltage switch may be maintained in the off state in order to, for example, prevent the driving voltage switch from burning, or otherwise failing to function properly.

The leakage current may be detected by a leakage current detection circuit. The leakage detection circuit comprises a driving voltage detection unit configured to detect a cut-off point of a driving voltage controlled through a driving voltage switch. The leakage current detection unit is configured to detect a leakage current of the driving voltage switch after cutting off the driving voltage, and configured to generate a leakage detection signal if a driving voltage related to a leakage current exceeds a reference detection voltage. The leakage detection circuit may further comprise a driving voltage control unit configured to turn off the driving voltage switch at the cut-off point of the driving voltage to cut off a driving voltage. The driving voltage control unit may be configured to maintain the driving voltage switch in an off state when a leakage detection signal is received.

The leakage current detection unit may receive a driving voltage generated by sensing a leakage current passing through the driving voltage switch when the driving voltage switch is turned off.

The driving voltage control unit may check for the leakage current at each cut-off point of the driving voltage.

The driving voltage detection unit may compare the driving voltage with a pre-determined reference voltage to detect the cut-off point of the driving voltage.

The driving voltage control unit may control a cycle of a driving voltage control signal provided to a driving voltage switch based on a level of the reference voltage.

The driving voltage control unit may include a storage element configured to change an output value based on a change in the driving voltage.

The storage element may receive an output of the driving voltage switch and an oscillator.

The driving voltage control unit may include a logic element configured to output a logic value based on the storage element and outputs of the leakage current detection unit.

The driving voltage control unit may include a gate driver configured to output a driving voltage control signal in order to maintain the driving voltage switch in an off state when a leakage detection signal is generated.

The leakage current detection unit may output a leakage detection signal when a driving voltage related to the leakage current exceeds a reference detection voltage at a certain reference point in a cut-off section of a driving voltage.

According to another aspect of the disclosure, an LED light apparatus is provided, wherein the apparatus comprises an LED module, a diode connected in parallel with the LED module, a driving voltage switch connected in series with the LED module, and a diode and a leakage current detection circuit configured to receive a driving voltage that drives the LED module to detect a leakage current passing through the driving voltage switch. The leakage current detection circuit may detect a cut-off point of a driving voltage controlled through the driving voltage switch. The leakage current detection circuit may detect a leakage current of the driving voltage switch after the driving voltage is cutoff, and generate a leakage detection signal when a driving voltage related to the leakage current exceeds a reference detection voltage, to turn off the driving voltage switch at the cut-off point of the driving voltage to cut-off the driving voltage and to keep the driving voltage switch in an off state when a leakage detection signal is received.

The leakage current detection circuit may output a leakage detection signal when a driving voltage related to a leakage current exceeds a reference detection voltage at a certain reference point in a cut-off section of a driving voltage.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an embodiment of the present disclosure, a leakage current detection circuit and a light apparatus having the same may detect a leakage current passing through a driving voltage switch when an abnormal situation of the leakage current detection circuit or the light apparatus occurs.

The leakage current detection circuit and/or the light apparatus having the same may detect a leakage current to maintain a driving voltage switch in an off state.

The leakage current detection circuit and/or the light apparatus having the same may maintain a driving voltage switch in an off state to prevent the driving voltage switch from burning or otherwise failing to function properly.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Figure 1:
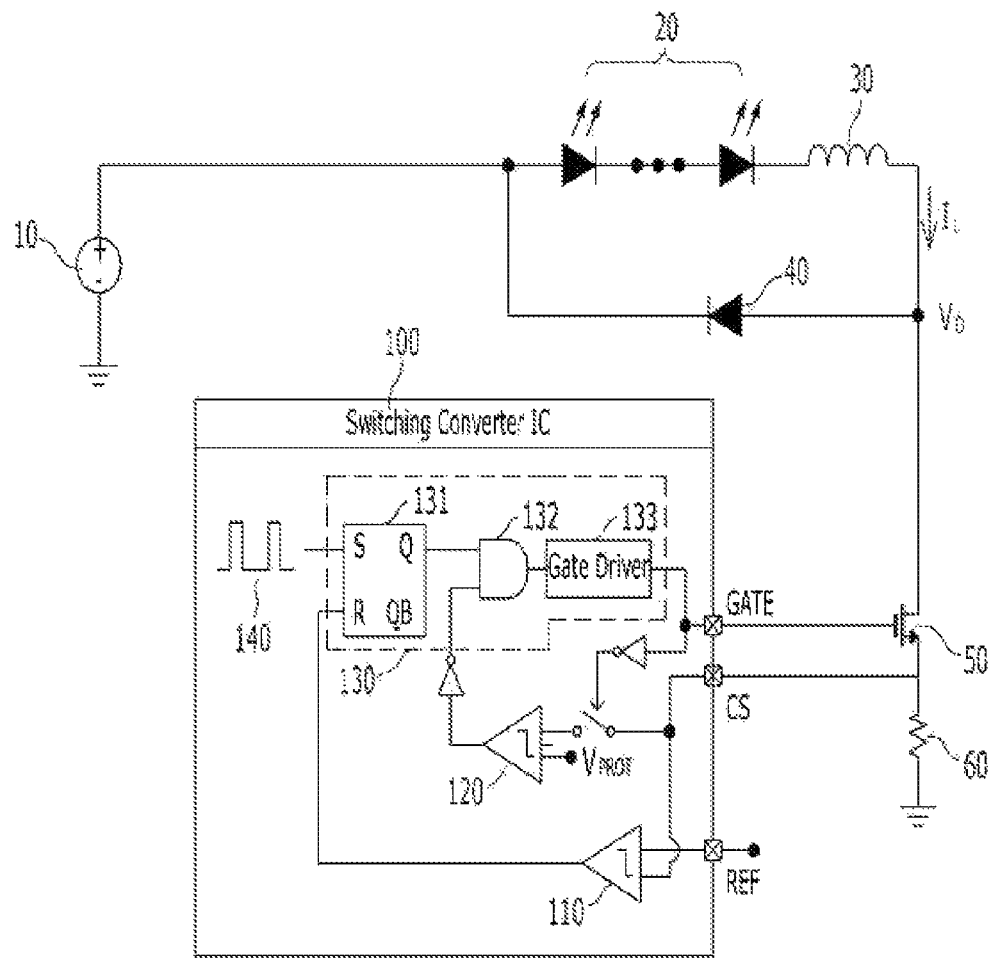
FIG. 1 is a circuit diagram illustrating an example of a leakage current detection circuit and light apparatus having the same according to the present disclosure.

The present disclosure is further described in the detailed description that follows.

DETAILED DESCRIPTION OF THE DISCLOSURE

The following detailed description is provided to assist the reader in gaining a comprehensive understanding of the methods, apparatuses, and/or systems described herein. The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Various changes, modifications, and equivalents of the systems, apparatuses and/or methods described herein will be apparent to one of ordinary skill in the art. Moreover, it is noted that like reference numerals represent similar parts throughout the several views of the drawings.

While terms such as "first," "second," and the like, may be used to describe various components, such components must not be understood as being limited to the terms. The terms are merely used to help the reader to distinguish one component from another.

It will be understood that when an element is referred to as being "connected to" or "connected with" another element, the element can be directly connected to the other element or intervening elements may also be present. In contrast, when an element is referred to as being "directly connected to" another element, no intervening elements are present, except where the context makes it clear that other intervening elements may be present. In addition, unless explicitly described to the contrary, the word "comprise" and variations such as "comprises" or "comprising," or synonyms such as "including" or "having," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

FIG. 1 is a circuit diagram illustrating an example of a leakage current detection circuit and a light apparatus having the same according to the present disclosure.

Referring to FIG. 1, an LED light apparatus includes an input power (power supply) source 10, an LED module 20, an inductor 30, a diode 40, a driving voltage switch 50, a sensing resistance 60 and a leakage current detection circuit 100. The sensing resistance 60 may include a resistance component such as, for example, a resistor or a plurality of resistors. The leakage current detection circuit 100 includes a driving voltage detection unit 110, a leakage current detection unit 120 and a driving voltage control unit 130.

The input power source 10 corresponds to a source of an input voltage ($V_{IN}$) such as, for example, a battery, a residential power grid, a commercial power grid, an electrical generator, or the like. The input voltage ($V_{IN}$) may correspond to a direct current voltage ($V_{DC}$) or an alternating current voltage ($V_{AC}$). When the input voltage ($V_{IN}$) corresponds to a direct current voltage ($V_{DC}$), the input power source 10 may supply stable direct current power, including direct current voltage ($V_{DC}$). Whereas, when the input voltage ($V_{IN}$) corresponds to an alternating current voltage ($V_{AC}$), a frequency of the alternating input voltage ($V_{IN}$) may correspond to, but is not necessarily limited to, 50 Hz or 60 Hz, depending on the particular electric power provider.

The LED module 20 may include LEDs that are formed into n groups, where n is a positive non-zero integer. The LED module 20 may include a plurality of LED modules. The LEDs in the LED module 20 may be connected to each other, for example, in series, in parallel, or in series-parallel connections. The LED module 20 may be driven by the input voltage ($V_{IN}$) from the power source 10.

In one embodiment of the disclosure, the light apparatus may include an LED light apparatus, which may be driven by a switching converter. The LED light apparatus may include, but is not necessarily limited to, a Buck-type switching converter. The LED light apparatus may include a Boost-type or a Buck-Boost-type switching converter. The LED light apparatus may be, but is not limited to, for example, a video display, a television display, a computer display, a mobile phone display, a tablet display, a heads-up display, or the like.

As seen in FIG. 1, the inductor 30 may be connected in series with the LED module 20, and it may be connected in parallel with the diode 40. The driving voltage switch 50 may be connected in series with the inductor 30 and the diode 40. In one embodiment, when the diode 40 is opened, the LED light apparatus may operate abnormally. The leakage current detection circuit 100 may detect a leakage current passing through the driving voltage switch 50 when the diode 40 is opened. Herein, a "leakage current" means a current that passes through the driving voltage switch 50 when the driving voltage switch is turned off. If an overvoltage is applied to a terminal of the driving voltage switch 50, a leakage current may generate and pass through the driving voltage switch 50. A driving current ($I_L$) drives the LED module 20. A "driving current" means a current that passes through the driving voltage switch 50 when the driving voltage switch 50 is turned on.

The driving voltage switch 50 may be arranged between the inductor 30 and the leakage current detection circuit 100. The driving voltage switch 50 may receive a driving voltage control signal to turn on or turn off. When the driving voltage switch 50 is turned on, a driving current ($I_L$) may flow through the sensing resistance 60. When the driving voltage switch 50 is turned off, the driving current ($I_L$) may cut off and stop flowing through the driving voltage switch 50. When the driving voltage switch 50 is turned on, the driving current ($I_L$) may charge the inductor 30 and, when the driving voltage switch 50 is turned off, the current charged in the inductor 30 may flow from the LED module 20 and through the diode 40. That is, when the driving voltage switch 50 is turned off, the inductor 30 may operate as a current source. The current may flow from the LED module 20 and through the diode 40 based on the energy stored in the inductor 30, thereby driving the LED module 20.

In one embodiment of the disclosure, the driving voltage switch 50 may be, or may include a power MOSFET. When the driving voltage switch 50 is (or includes) a power MOSFET, a driving voltage control signal may be transmitted and applied to a gate terminal of power MOSFET to control a flow of a driving current ($I_L$) through the power MOSFET. The driving voltage control signal may control the driving voltage switch 50 to turn on when the driving voltage control signal has a positive value (or high level or 1) and to turn off when the voltage control signal has a negative value (or low level or 0). The LED light apparatus may control an output such as, the driving current ($I_L$) to control the luminance or brightness of the LED module 20.

The sensing resistance 60 may be connected to the driving voltage switch 50 and to the leakage current detection circuit 100. The sensing resistance 60 may be connected in series with the driving voltage switch 50 and in series with the leakage current detection circuit 100. A voltage ($V_{CS}$) may be applied to the sensing resistance 60. The voltage ($V_{CS}$) may be applied to the leakage current detection circuit 100 through a current sensing (CS) pin where the leakage current detection circuit is formed, for example, as an IC chip. That is, the sensing resistance 60 may be connected at one end to a terminal of the driving voltage switch 50 for sensing the driving current ($I_L$) flowing through the driving voltage switch 50. The sensing resistance 60 may be connected at another end to the ground.

The driving voltage detection unit 110 may detect a cut-off point of the driving voltage ($V_{CS}$) that is controlled through the driving voltage switch 50. For instance, the driving voltage detection unit 110 may receive the driving voltage ($V_{CS}$) at an input through the CS pin and receive a reference voltage ($V_{REF}$) at another input through a REF pin. The REF pin may be connected to a reference voltage ($V_{REF}$) source (not shown), so as to provide a predetermined reference voltage ($V_{REF}$), which may have a predetermined constant value and/or which may be adjustable. The driving voltage detection unit 110 may compare the received driving voltage ($V_{CS}$) with the pre-determined reference voltage ($V_{REF}$) to detect a cut-off point of the driving voltage ($V_{CS}$). In one embodiment, the driving voltage detection unit 110 may output a positive value (high level or 1) when the driving voltage ($V_{CS}$) is equal to or greater than the reference voltage ($V_{REF}$). The driving voltage detection unit 110 may be configured to output the positive value when the driving voltage ($V_{CS}$) exceeds the reference voltage ($V_{REF}$). The driving voltage detection unit 110 may output a negative value (low level or 0) when the driving voltage ($V_{CS}$) is less than the reference voltage ($V_{REF}$).

The leakage current detection unit 120 may detect a leakage current flowing through the driving voltage switch 50 after the driving voltage ($V_{CS}$) is cutoff. The leakage current detection unit 120 may have an input connected to the CS pin through, for example, a switch or a relay, and another input connected to a reference detection voltage ($V_{PROT}$) source (not shown), so as to provide a predetermined reference detection voltage ($V_{PROT}$), which may have a predetermined constant value and/or which may be adjustable. The leakage current detection unit 120 may generate a leakage detection signal when the driving voltage ($V_{CS}$) related to the leakage current exceeds the reference detection voltage ($V_{PROT}$). For instance, the leakage current detection unit 120 may receive the driving voltage ($V_{CS}$) and the reference detection voltage ($V_{PROT}$) and compare the driving voltage ($V_{CS}$) with the pre-determined reference detection voltage ($V_{PROT}$) to determine whether or not there is a leakage current. In one embodiment, the leakage current detection unit 120 may output a positive value (high level or 1) when the driving voltage ($V_{CS}$) exceeds the pre-determined reference detection voltage ($V_{PROT}$).

Figure 3:
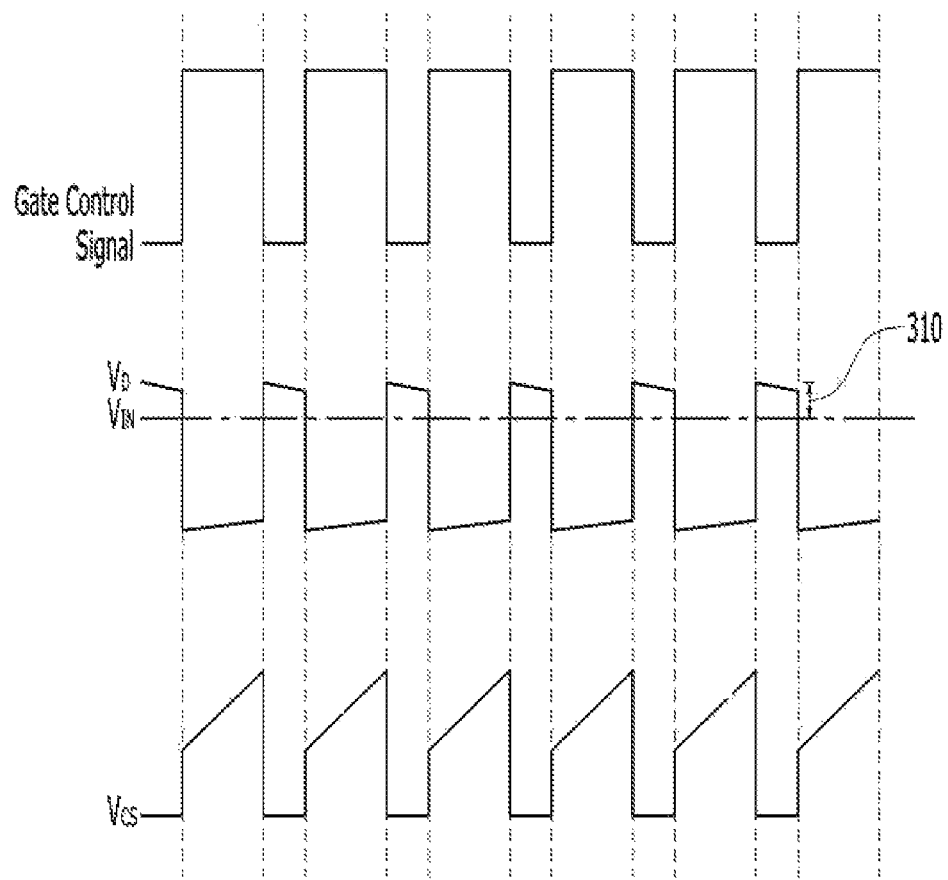
FIG. 3 is a waveform diagram illustrating a normal operating situation of a leakage current detection circuit and/or light apparatus having the same in FIG. 1.
Figure 6:
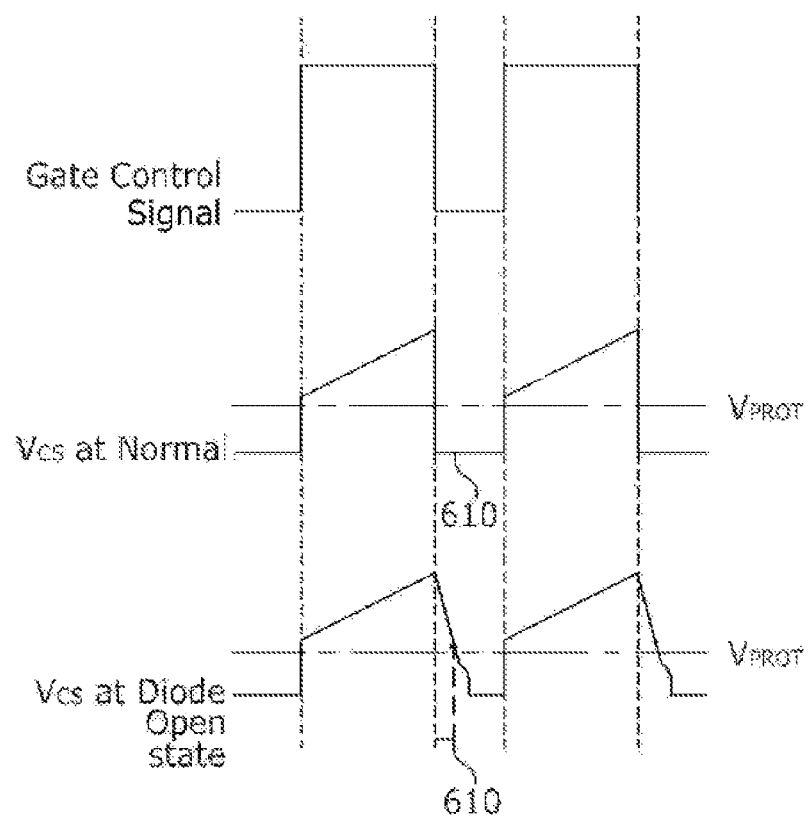
FIG. 6 is a waveform diagram illustrating an example of a method of detecting a leakage current by the leakage current detection circuit in FIG. 1.

The leakage current detection unit 120 may receive a driving voltage ($V_{CS}$) that is generated by a leakage current passing through the driving voltage switch 50 while the driving voltage switch 50 is turned off. The leakage current detection unit 120 may output a leakage detection signal when the driving voltage ($V_{CS}$) related to a leakage current exceeds the reference detection voltage ($V_{PROT}$) at a certain reference point in a cut-off section of the driving voltage ($V_{CS}$). In FIG. 3 or FIG. 6, an example of a leakage current sensing method is illustrated in detail.

The driving voltage control unit 130 may include a storage element 131, a logic element 132 and a gate driver 133. The storage element 131 may be electrically connected to the driving voltage detection unit 110 and an oscillator 140. The storage element 131 may receive as a first input an output of the driving voltage detection unit 110 and as a second input an output of the oscillator 140. The storage element 131 may change an output value (e.g., toggle between a high value and a low value) based on an output change point of the driving voltage detection unit 110. In one embodiment, the storage element 131 may be, or may include an SR latch. When the storage element 131 is formed as, or includes an SR latch, the SR latch may receive the oscillator 140 output at an S terminal, and it may receive the driving voltage detection unit 110 output at an R terminal of the SR latch.

The logic element 132 may be electrically connected to the storage element 131 and the leakage current detection unit 120. The logic element 132 may output a logic value based on the outputs of the storage element 131 and the leakage current detection unit 120. In one embodiment, the logic element 132 may be, or may include an AND gate (or circuit). When the logic element 132 is formed as, or includes the AND gate, the logic element 132 may receive positive values (high level or 1) at all input terminals to output a positive value. For example, when the storage element 131 outputs a positive value and the leakage current detection unit 120 outputs a negative value (low level or 0), the logic element 132 may output a positive value. As seen in FIG. 1, a NOT gate may be provided in series between the leakage current detection unit 120 and the input of the logic element 132.

The gate driver 133 may receive an output value of the logic element 132 to output a driving voltage control signal. The driving voltage control signal may be supplied to the driving voltage switch 50 through, for example, a GATE pin where the leakage current detection circuit 100 is provided as an IC chip. For instance, the gate driver 133 may output a driving voltage control signal to the driving voltage switch 50 to maintain the driving voltage switch 50 in an off state when the leakage detection signal is detected. The driving voltage control signal may also be supplied to a relay (or switch) through a NOT gate to control an input to the leakage current detection unit 120, so that when the driving voltage switch 50 is turned off the relay is closed and the driving voltage ($V_{CS}$) is supplied to the leakage current detection unit 120.

In the case where the driving voltage switch 50 includes a power MOSFET, the driving voltage control signal may be supplied to the gate terminal of the power MOSFET. When the leakage current detection unit 120 outputs a positive value (or a leakage detection signal), the logic element 132 may output a negative value (low level or 0) and the gate driver 133 may receive a negative value from the logic element 132 to maintain the driving voltage switch 50 in an off state, regardless of the output of the storage element 131. In one embodiment, the gate driver 133 may amplify an output of the logic element 132 up to a required voltage to turn-on or turn-off of the driving voltage switch 50, and the gate driver 133 may output the driving voltage control signal at low impedance.

The driving voltage control unit 130 may turn off the driving voltage switch 50 at a cut-off point of the driving voltage ($V_{CS}$) to cut off the driving voltage ($V_{CS}$) and may maintain the driving voltage switch 50 in an off state when the leakage detection signal is received. For instance, the leakage current detection circuit 100 may detect a leakage current passing through the driving voltage switch 50 when an abnormal situation occurs, such as, for example, in the LED light apparatus. For example, the LED light apparatus may operate abnormally when the diode 40 is opened. The driving voltage control unit 130 may check whether or not there is a leakage current at each cut-off point of the driving voltage ($V_{CS}$). When a leakage detection signal is generated by the leakage current detection unit 120, the driving voltage control unit 130 may cut off the driving voltage ($V_{CS}$) to maintain the driving voltage switch 50 in an off state, thereby preventing the driving voltage switch 50 from burning or otherwise malfunctioning. The driving voltage switch 50 may malfunction, for example, when a leakage current is generated and flows through the driving voltage switch 50 thereby, possibly, causing the LEDs in the LED module 20 to illuminate during cutoff periods. Whereas, when a leakage current isn't detected, the driving voltage control unit 130 may periodically output a driving voltage control signal to drive the LED light apparatus normally.

Figure 2:
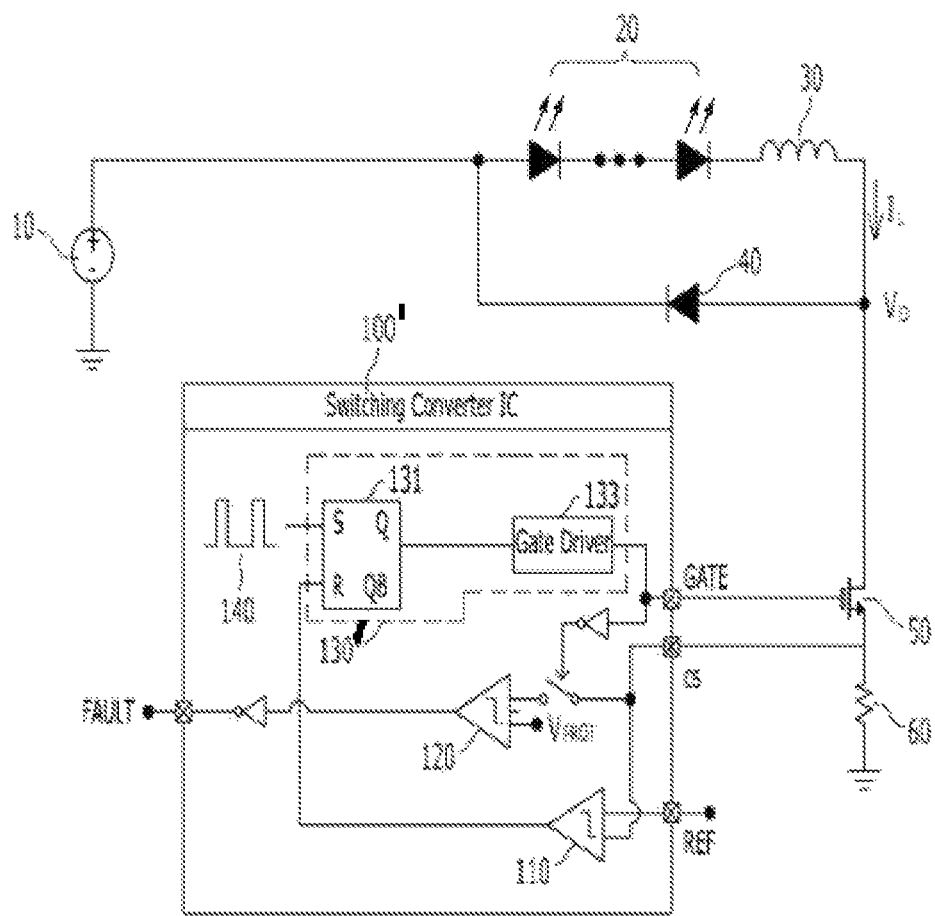
FIG. 2 is a circuit diagram illustrating another example of a leakage current detection circuit according to the present disclosure.

FIG. 2 is a circuit diagram illustrating another example of a leakage current detection circuit according to the principles of the disclosure.

Referring FIG. 2, a leakage current detection circuit 100' may include the driving voltage detection unit 110, the leakage current detection unit 120, and a driving voltage control unit 130'. The driving voltage control unit 130' may include the storage element 131 and the gate driver 133.

The leakage current detection unit 120 may detect a leakage current flowing through the driving voltage switch 50 after the driving voltage ($V_{CS}$) is cutoff. The leakage current detection unit 120 may generate a leakage detection signal when the driving voltage ($V_{CS}$) related to the leakage current exceeds the reference detection voltage ($V_{PROT}$). The leakage current detection unit 120 may receive the driving voltage ($V_{CS}$) and the reference detection voltage ($V_{PROT}$). The leakage current detection unit 120 may compare the driving voltage ($V_{CS}$) with the pre-determined reference detection voltage ($V_{PROT}$) to determine whether or not there is a leakage current. The leakage current detection unit 120 may provide a leakage detection signal to the outside through a FAULT pin, for example, where the leakage current detection circuit 100' is provided as an IC chip. When a leakage current is detected, the leakage current detection unit 120 may provide, for example, a notice signal to a user through the FAULT pin.

The storage element 131 may receive an output of the driving voltage detection unit 110 and the oscillator 140. The storage element 131 may change an output value based on an output change point of the driving voltage detection unit

110. In one embodiment, the storage element 131 may be formed as, or include an SR latch. When the storage element 131 is formed as, or includes an SR latch, the SR latch may receive an output of the oscillator 140 at its S terminal, and it may receive an output of the driving voltage detection unit 110 at its R terminal.

The gate driver 133 may receive an output value of the storage element 131 to output the driving voltage control signal. The gate driver 133 may turn off the driving voltage switch 50 at a cut-off point of the driving voltage ($V_{CS}$). In one embodiment, the gate driver 133 may amplify an output of the storage element 131 up to the voltage necessary to turn-on or turn-off of the driving voltage switch 50, and it may output the driving voltage control signal at low impedance.

Figure 4:
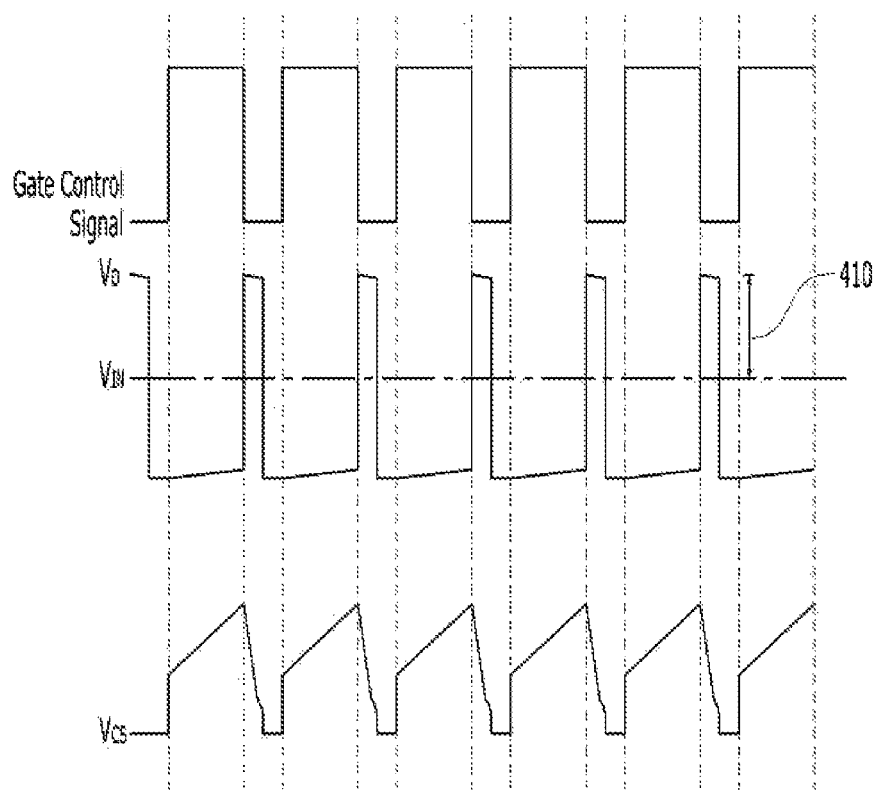
FIG. 4 is a waveform diagram illustrating an example of an abnormal operating situation of a leakage current detection circuit and/or light apparatus having the same in FIG. 1.

FIG. 3 is a waveform diagram illustrating normal operation of the leakage current detection circuit 100 (or 100') and the light apparatus having the same; and FIG. 4 is a waveform diagram illustrating an abnormal operation of the leakage current detection circuit 100 (or 100') and the light apparatus having the same. The normal operation of the LED light apparatus may correspond to the case in which the diode 40 (shown in FIGS. 1 and 2) operates normally, and a leakage current is not detected. The abnormal operation may corresponds to the case in which the diode 40 is opened and a leakage current results.

Referring to FIG. 3 and FIG. 4, the driving voltage control unit 130 (or 130') may output a driving voltage control signal (Gate Control Signal) that repeats in a certain cycle. In one embodiment, the driving voltage control unit 130 (or 130') may control a cycle of the driving voltage control signal supplied to the driving voltage switch 50 based on the reference voltage ($V_{REF}$) level. That is, a cycle of the driving voltage control signal may be proportional to the reference voltage ($V_{REF}$) level. For example, a cycle of the driving voltage control signal may increase when the level of the reference voltage ($V_{REF}$) increases and a cycle of the driving voltage control signal may decrease when the level of the reference voltage ($V_{REF}$) decreases. Therefore, the driving voltage control unit 130 (or 130') may control the level of the reference voltage ($V_{REF}$) to control the cycle of the driving voltage control signal.

In FIG. 3, when the LED light apparatus operates normally, the driving voltage control unit 130 (or 130') may periodically output the driving voltage control signal. When the driving voltage switch 50 turns on, the driving current ($I_L$) may flow through the driving voltage switch 50 and through the sensing resistance 60, thereby increasing the driving voltage ($V_{CS}$) steadily. That is, when the driving voltage switch 50 turns on, a voltage ($V_D$) applied between the driving voltage switch 50 and the inductor 30 may be lower than the input voltage ($V_{IN}$), so the driving current ($I_L$) may drive the LED module 20 and flow through the driving voltage switch 50. In one embodiment, when the driving voltage switch 50 is formed as, or includes a power MOSFET, the voltage ($V_D$) applied between the driving voltage switch 50 and the inductor 30 may correspond to a drain voltage of the power MOSFET.

Referring to FIG. 3, when the driving voltage switch 50 turns off, the driving voltage switch 50 may cut off flow of the driving current ($I_L$). When the flow of the driving current ($I_L$) cuts off, the value of the drain voltage ($V_D$) may be larger than the value of the input voltage ($V_{IN}$), so the driving current ($I_L$) may flow in the LED module 20 through the diode 40. A difference 310 between the drain voltage ($V_D$) and the input voltage ($V_{IN}$) may correspond to a tolerance band needed for operating of the light apparatus and/or the leakage current detection circuit 100 (or 100').

In FIG. 4, when the LED light apparatus operates abnormally, the driving voltage control unit 130 (or 130') may output a driving voltage control signal periodically. When the driving voltage switch 50 is turned on, the LED light apparatus may operate normally.

Whereas, when the driving voltage switch 50 turns off, the driving voltage switch 50 may cut off flow of the driving current ($I_L$). When flow of the driving current ($I_L$) is cut off, the value of the drain voltage ($V_D$) may be larger than a value of the input voltage ($V_{IN}$), but the driving current ($I_L$) may not flow through the diode 40 when the diode 40 is opened. Herein, a difference 410 between the voltage applied between the driving voltage switch 50 and the inductor 30 and the input voltage ($V_{IN}$) may exceed a tolerance band needed for operation of the leakage current detection circuit 100 (or 100') and/or the LED light apparatus. Therefore, the drain voltage ($V_D$) between the driving voltage switch 50 and the inductor 30 may have an overvoltage level that is applied to the driving voltage switch 50, thereby causing a leakage current to be generated and passed through the driving voltage switch 50. In one embodiment, when the leakage current generates, the driving voltage may decrease. In this regard, the driving voltage may decrease gradually, with a certain slope. That is, although the driving voltage switch 50 turns off, some voltage ($V_{CS}$) may be applied across the sensing resistance 60. Therefore, if a leakage current is detected, the driving voltage control unit 130 (or 130') may turn off the driving voltage switch 50 and maintain the driving voltage switch 50 in the off state in order to prevent the driving voltage switch 50 from burning or otherwise malfunctioning.

Figure 5:
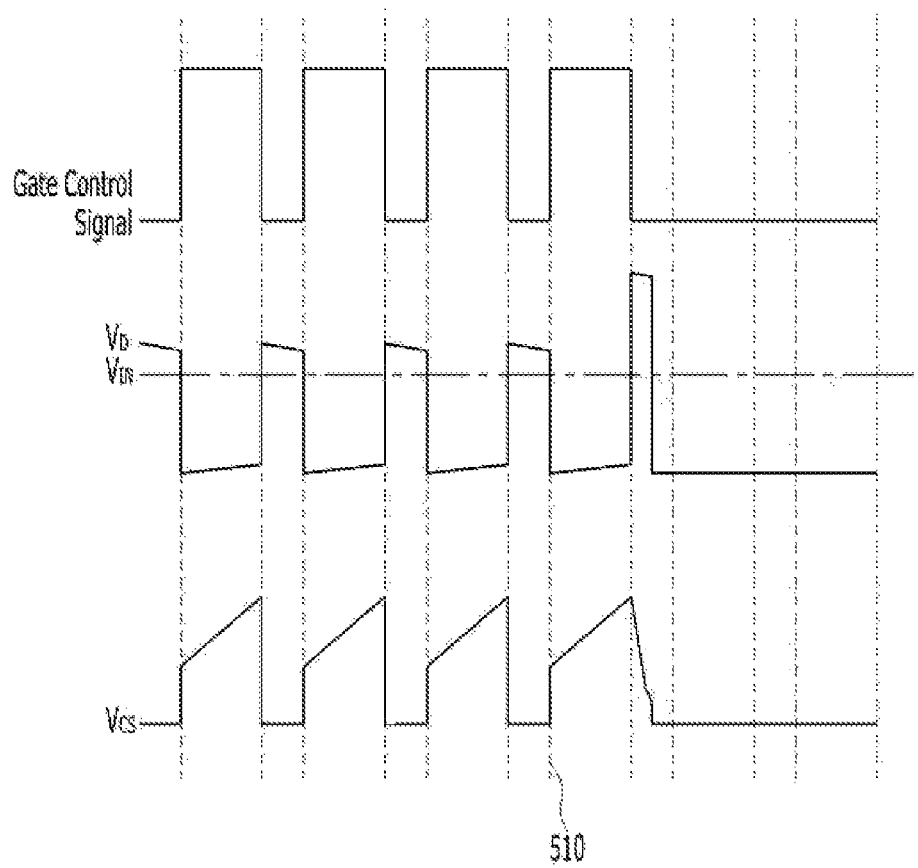
FIG. 5 is a waveform diagram illustrating an example of preventing a mal-effect to the driving voltage switch when an abnormal situation occurs on a leakage current detection circuit and/or light apparatus having the same in FIG. 1, wherein the mal-effect may include a burning or other improper functioning of the driving voltage switch.

FIG. 5 is a waveform diagram illustrating an example of controlling the driving voltage switch during an abnormal situation in the leakage current detection circuit 100 (or 100') and/or the LED light apparatus having the same.

Referring FIG. 5, the driving voltage control unit 130 (or 130') may check whether or not there is a leakage current at each cut-off point 510 of a driving voltage ($V_{CS}$). That is, when a leakage current isn't detected, the driving voltage control unit 130 (or 130') may periodically output a driving voltage control signal to drive the LED light apparatus normally.

In one embodiment, when a leakage current is detected by the leakage current detection unit 120, the driving voltage control unit 130 (or 130') may turn off the driving voltage switch 50 and maintain the driving voltage switch 50 in the off state. Therefore, operation of the LED light apparatus may generally be stopped.

FIG. 6 is a waveform diagram illustrating an example a leakage current detection method that may be implemented by the leakage current detection circuit 100 (or 100').

Referring to FIGS. 1 and 6 (or FIGS. 2 and 6), the leakage current detection unit 120 may output a leakage detection signal when a driving voltage ($V_{CS}$) related to a leakage current exceeds a reference detection voltage ($V_{PROT}$) at a certain reference point 610 and 620 in a cut-off section of a driving voltage ($V_{CS}$). The leakage current detection unit 120 may receive a driving voltage ($V_{CS}$) generated through a sensing of a leakage current passing through the driving voltage switch 50 when the driving voltage switch 50 is turned off. In one embodiment, when the LED light apparatus operates normally, a leakage current may not be generate and the driving voltage ($V_{CS}$) may be lower than the reference detection voltage ($V_{PROT}$) at a certain reference point 620.

Whereas, when the LED light apparatus operates abnormally, a leakage current may generate and the driving voltage ($V_{CS}$) may be higher than the reference detection voltage ($V_{PROT}$) at the reference point 610. When the driving voltage ($V_{CS}$) is higher than the reference detection voltage ($V_{PROT}$) at the reference point 610, the leakage current detection unit 120 may generate a leakage detection signal and supply the leakage detection signal to the driving voltage control unit 130 (or 130').

Figure 7:
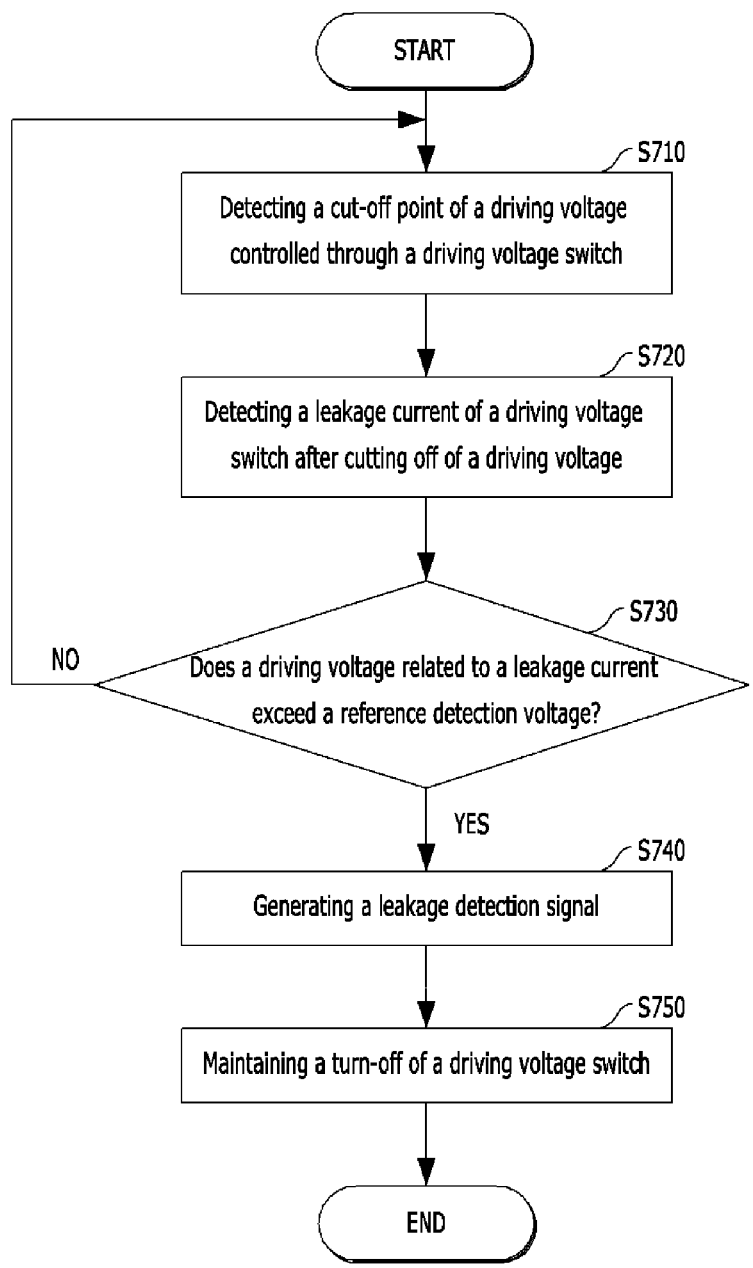
FIG. 7 is a flow chart illustrating an example of a method of driving a leakage current detection circuit according to the present disclosure.

FIG. 7 is a flow chart illustrating an example of a driving method of a leakage current detection circuit according to the principles of the disclosure.

Referring to FIGS. 1 (or 2) and 7, the driving voltage detection unit 110 may detect a cut-off point of the driving voltage ($V_{CS}$) controlled through the driving voltage switch 50. The driving voltage detection unit 110 may receive the driving voltage ($V_{CS}$) through the CS pin and the reference voltage ($V_{REF}$) through the REF pin. The driving voltage detection unit 110 may detect a cut-off point of the driving voltage by comparing the driving voltage ($V_{CS}$) with the pre-determined reference voltage ($V_{REF}$) (step S710).

The leakage current detection unit 120 may detect a leakage current of the driving voltage switch 50 after cutting off the driving voltage ($V_{CS}$) (step S720). The driving voltage control unit 130 (or 130') may check whether or not there is a leakage current at each cut-off point of the driving voltage ($V_{CS}$).

The leakage current detection unit 120 may receive the driving voltage ($V_{CS}$) and the reference detection voltage ($V_{PROT}$). The leakage current detection unit 120 may compare the driving voltage ($V_{CS}$) with the pre-determined reference detection voltage ($V_{PROT}$) to determine whether or not there is a leakage current (step S730).

When the driving voltage ($V_{CS}$) exceeds the reference detection voltage ($V_{PROT}$), the leakage current detection unit 120 may detect a leakage current and output a leakage detection signal. In one embodiment, the leakage current detection unit 120 may output a positive value (high level or 1) when the driving voltage ($V_{CS}$) exceeds the pre-determined reference detection voltage ($V_{PROT}$) (step S740).

The driving voltage control unit 130 (or 130') may turn off the driving voltage switch 50 at a cut-off point of the driving voltage to cut off the driving voltage ($V_{CS}$) and maintain the driving voltage switch 50 in the off state when a leakage detection signal is received. The LED light apparatus may operate abnormally when the diode 40 is opened. When a leakage detection signal is generated by the leakage current detection unit 120, the driving voltage control unit 130 (or 130') may cut off the driving voltage ($V_{CS}$) to maintain the driving voltage switch 50 in the off state, thereby preventing the driving voltage switch 50 from burning or otherwise malfunctioning (step S750).

Therefore, when an abnormal situation occurs in a light emitting diode light apparatus, the leakage current detection circuit 100 (or 100'), and the light apparatus having the same, may detect a leakage current passing through the driving voltage switch 50. The leakage current detection circuit 100 (or 100') may detect a leakage current flowing through the driving voltage switch 50 and control the driving voltage switch to keep it in the off state during the cutoff periods, thereby preventing the driving voltage switch from burning or otherwise malfunctioning.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed is:

1. A leakage current detection circuit, comprising:
   a driving voltage detection unit configured to detect a cut-off point of a driving voltage controlled through a driving voltage switch;
   a leakage current detection unit configured to detect a leakage current of the driving voltage switch after cutting off the driving voltage, and further configured to generate a leakage detection signal when the driving voltage related to the leakage current exceeds a reference detection voltage; and
   a driving voltage control unit configured to turn off the driving voltage switch at the cut-off point of the driving voltage, and further configured to maintain the driving voltage switch in an off state when the leakage detection signal is received.

2. The leakage current detection circuit of claim 1, wherein the leakage current detection unit receives the driving voltage generated by the leakage current passing through the driving voltage switch when the driving voltage switch is turned off.

3. The leakage current detection circuit of claim 1, wherein the driving voltage control unit checks for the leakage current at each cut-off point of the driving voltage.

4. The leakage current detection circuit of claim 1, wherein the driving voltage detection unit compares the driving voltage with a pre-determined reference voltage to detect the cut-off point of the driving voltage.

5. The driving voltage detection unit of claim 4, wherein the driving voltage control unit controls a cycle of a driving voltage control signal provided to the driving voltage switch based on a level of the pre-determined reference voltage.

6. The leakage current detection circuit of claim 1, wherein the driving voltage control unit includes a storage element configured to change an output value based on an output change point of the driving voltage detection unit.

7. The driving voltage control unit of claim 6, wherein the storage element receives an output of the driving voltage detection unit and an oscillator.

8. The driving voltage control unit of claim 6, wherein the driving voltage control unit includes a logic element configured to output a logic value based on an output of the storage element and an output of the leakage current detection unit.

9. The leakage current detection circuit of claim 1, wherein the driving voltage control unit includes a gate driver configured to output a driving voltage control signal to maintain the driving voltage switch in the off state when the leakage detection signal is received.

10. The leakage current detection circuit of claim 1, wherein the leakage current detection unit outputs the leakage detection signal when a driving voltage related to the leakage current exceeds the reference detection voltage at a certain reference point in a cut-off section of the driving voltage.

11. A light emitting diode light apparatus, comprising:
    a plurality of LEDs;
    a diode connected in parallel to the plurality of LEDs;
    a driving voltage switch connected in series to the plurality of LEDs and the diode; and
    a leakage current detection circuit configured to receive a driving voltage driving the plurality of LEDs to detect a leakage current passing through the driving voltage switch, wherein the leakage current detection circuit:
  detects a cut-off point of the driving voltage controlled through the driving voltage switch,
  detects the leakage current of the driving voltage switch after cutting off the driving voltage to generate a leakage detection signal when the driving voltage related to the leakage current exceeds a reference detection voltage, and
  turns off the driving voltage switch at the cut-off point of the driving voltage to cut-off the driving voltage and maintain the driving voltage switch in an off state when the leakage detection signal is received.

12. The light emitting diode light device of claim 11, wherein the leakage current detection circuit outputs the leakage detection signal when the driving voltage related to the leakage current exceeds the reference detection voltage at a certain reference point in a cut-off section of the driving voltage.

13. A method of detecting a leakage current, comprising:
  detecting a cut-off point of a driving voltage controlled through a driving voltage switch;
  detecting a leakage current of the driving voltage switch after cutting off the driving voltage, and generating a leakage detection signal when the driving voltage related to the leakage current exceeds a reference detection voltage; and
  turning off the driving voltage switch at the cut-off point of the driving voltage to cut-off the driving voltage and to maintain the driving voltage switch in an off state when the leakage detection signal is generated.

14. The method of claim 13, wherein the leakage current is detected at each cut-off point of the driving voltage.

15. The method of claim 13, wherein the detecting the cut-off point of the driving voltage comprises:
  comparing the driving voltage with a predetermined reference voltage.

* * * * *